United States Patent
Entwistle et al.

(10) Patent No.: US 6,941,158 B2
(45) Date of Patent: Sep. 6, 2005

(54) PORTABLE COMMUNICATIONS DEVICE

(75) Inventors: Paul Entwistle, Bramley (GB); Vincent Tibbs, Plymouth (GB)

(73) Assignee: Pace Micro Technology Plc, Shipley (GB)

( * ) Notice: Subject to any disclaimer, the term of this patent is extended or adjusted under 35 U.S.C. 154(b) by 631 days.

(21) Appl. No.: 09/848,815

(22) Filed: May 4, 2001

(65) Prior Publication Data

US 2001/0041589 A1 Nov. 15, 2001

(30) Foreign Application Priority Data

| May 8, 2000 | (GB) | ............................................... 0010927 |
| May 5, 2000 | (GB) | ............................................... 0010928 |
| May 5, 2000 | (GB) | ............................................... 0010929 |

(51) Int. Cl.[7] .............................. H04B 1/38; H04M 1/00
(52) U.S. Cl. .................... 455/556.2; 455/557; 379/447; 345/169
(58) Field of Search .......................... 455/556.1, 556.2, 455/557, 418, 419, 566, 569.1, 575.1, 575.3, 575.4, 90.2; 379/441, 447; 345/169, 180, 183, 1.1; 370/338

(56) References Cited

U.S. PATENT DOCUMENTS

| 5,615,384 | A | * | 3/1997 | Allard et al. | ............... 345/800 |
| 5,680,233 | A | | 10/1997 | Faris et al. | .................... 359/41 |
| 5,719,936 | A | | 2/1998 | Hillenmayer | ............... 379/447 |
| 5,859,628 | A | | 1/1999 | Ross et al. | ................... 345/173 |
| 5,867,795 | A | * | 2/1999 | Novis et al. | ................ 455/566 |
| 5,983,073 | A | | 11/1999 | Ditzik | ....................... 455/11.1 |
| 6,073,034 | A | * | 6/2000 | Jacobsen et al. | ............ 455/566 |
| 6,158,884 | A | * | 12/2000 | Lebby et al. | ............... 368/282 |
| 6,490,155 | B2 | * | 12/2002 | Han et al. | .................... 361/686 |
| 6,505,055 | B1 | * | 1/2003 | Kahn et al. | ................. 455/564 |
| 2002/0021287 | A1 | * | 2/2002 | Tomasi et al. | .............. 345/168 |

* cited by examiner

Primary Examiner—Nay Maung
Assistant Examiner—Edan Orgad
(74) Attorney, Agent, or Firm—Head, Johnson & Kachigian

(57) ABSTRACT

A device (2) which allows for the input of visual, audio and/or auxiliary data, the processing of the data and storage of the data in the device. The device (2) is provided with a display screen (16) for the display of the visual data and/or speakers for the sounding of the audio data. The device (2) allows for the selected communication of the visual, audio and/or auxiliary data to and/or from a remote location either directly via a communications link or via a broadcast data receiver, and then via a communications link. The device (2) is of such size so as to be hand held and portable and can be located in a holder (10). The holder (10) can be provided with lighting means (12) to improve viewing of the display screen of the device and/or magnification means to allow data to be magnified and projected on a further surface (20) for viewing and/or audio means to allow for the generation of sound from received audio data.

22 Claims, 4 Drawing Sheets

PORTABLE COMMUNICATIONS DEVICE

CROSS REFERENCE TO RELATED APPLICATIONS

This application claims priority to British Application Nos. 0010928 filed May 5, 2000; No. 0010929.8 filed May 5, 2000; and No. 0010927.2 filed May 8, 2002.

BACKGROUND OF THE INVENTION

The invention which is the subject of this application relates to a communications device, and particularly to a communications device for use with a broadcast data receiver.

Communications devices having broadcast data receivers are known and include televisions and radios. These devices include processing means to process data received from a remote location, and audio and/or visual means to show or sound the processed data to a user. Whilst these devices allow for the communication of information to a user, this communication is only in a single direction. In addition, conventional communication devices are typically large and are not easily movable around a premises, such as a user's home.

SUMMARY OF THE INVENTION

It is therefore an aim of the present invention to provide a communications device which allows a user to both receive data from a remote location and to send data to a remote location.

It is a further aim of the present invention to provide a communications device which is easily portable about a premises.

In a first aspect of the invention there is provided a device which allows for the input of visual, audio and/or auxiliary data, the processing of said data and storage of said data in the device, said device provided with a display screen for the display of said visual data and/or speakers for sounding of said audio data characterised in that said device allows for the selected communication of said visual, audio and/or auxiliary data to and/or from a remote location directly via a broadcast data receiver, or via a broadcast data receiver and then via a communications link, said device being of such a size to be hand held and portable.

Preferably the device can be provided in a holder/cradle to store the device when not in use and/or to allow the device to operate.

Preferably the holder is provided with a light source which is directed, when the device is placed in the holder, to provide improved lighting of the display screen of the device.

In one embodiment, the light source provided in the holder is in an off position or unlit condition until the device is placed onto the holder which acts to enable the light source.

In one preferred embodiment, light guide means are provided between the holder/cradle and the device which serve to guide the light emitted from the light source in the holder into the device and onwardly onto the display so as to provide the desired lighting effect on the same. In one embodiment the light guiding means are Perspex or fibre optic guide means.

In another embodiment, when the device enables the light source in the holder, the light source is switched on. In another embodiment, when enabled, the light source may still not be provided in a lit condition until the same is switched on by the reception of the device by incoming data. Thus, the device may be positioned in the holder with the light source in an enabled but an unlit condition until, for example, data for an advert is received from a remote location or from a broadcast data receiver and said advert is generated on the display. At the same time, a signal is transmitted to the enabled light source in the holder and control means therefore cause the same to light and hence the material on the display screen is more clearly viewable. Furthermore, the change on the screen from unlit to lit will serve to attract the attention of the user of the device if they are in the vicinity of the same at the time of change.

Typically, the device itself will be provided with some form of back lighting for the display but the extent and level of illumination provided by the back lighting will be normally restricted by the constrictions of power consumption, size of the device and so on, and therefore the light source provided in the holder will typically provide an extra level of illumination. Reference hereonin to lit and unlit conditions of the device when in the holder refer to the illumination of the light source in the holder and not to the state of any lighting means which may be provided in the device itself.

In an alternative embodiment, the light source in the holder may be permanently switched on so that as soon as the device is placed in the holder, an improved display is provided and in some instances, it is envisaged that the user may simply place the device on the holder so as to more clearly view the display screen and use the device and may do so at frequent intervals when actually using the device in the vicinity of the holder.

It is envisaged that the holder will also be provided with means for charging the power source of the device and other means and facilities including for example the provision of a speaker to allow audio reproduction via the holder.

In one embodiment means are provided to allow the material displayed on the display screen to be magnified and projected against a further surface for viewing.

In one embodiment the material to be displayed is displayed both on the display screen of the device and on said further surface in a magnified form.

Preferably the holder will include a magnifying means whereby the data which is provided to generate the material to be displayed on the display screen is passed to the magnified means in the holder, processed and projected onto the further surface.

In one embodiment the magnifying means includes a magnifying lens in the holder. In an alternative embodiment the data to be displayed is processed in a magnified condition.

Preferably the further surface onto which the magnified data is displayed is a wall, door, ceiling, cupboard and/or the like, thereby increasing the effectiveness of the material displayed.

In an alternative embodiment the device rather than the holder includes the magnification means and the same process is followed except that the material to be displayed is generated within the device and the device is provided with means for projecting the same onto the further surface. This format allows the magnified projection of material onto a further surface at any location.

In yet a further embodiment the device need not be positioned in the holder to allow the holder to generate the magnified material on the said further surface whereby there is provided a data link which may be wireless, between the device and processing means in the holder which allow data to be received either directly by the holder from a remote location, or by the device and transferred by the device to the holder whereupon the holder, if activated, can allow for the projection and magnification of the material.

It is also noted that the ability for the holder to generate the magnified material can with respect to a holder for the device of the type described in detail on the preamble or may be another form of device, such as for example, a mobile telephone or any other form of device which is provided with display means and by which information received for display on a display screen can also be projected via projection means provided in the device or on the holder and reference hereonin to the device should be taken to incorporate any such form of the same.

According to a further aspect of the present invention there is provided a device which allows for the input of visual, audio and/or auxiliary data, the processing of data and the storage of said data in the device, said device provided with a display screen for the display of said visual data and/or speakers for sounding of said audio data, said device allowing for the selected communication of said visual, audio and/or auxiliary data to and/or from a remote location either directly via a communications link or via a broadcast data receiver, and then via a communications link, said device provided for location in a holder and characterised in that said holder includes a light source, which light source is directed, when the device is placed on said holder, to provide improved lighting of the display screen of the device.

According to a yet further aspect of the present invention there is provided a device which allows for the input of visual, audio and/or auxiliary data, the processing of data and the storage of said data in the device, said device provided with a display screen for the display of said visual data and/or speakers for sounding of said audio data, said device allowing for the selected communication of said visual, audio and/or auxiliary data to and/or from a remote location either directly via a communications link or via a broadcast data receiver, and then via a communications link, said device provided for location in a holder and characterised in that said device and/or holder means is/are provided with magnification means to allow the material for display on the display screen of the device to be magnified and projected against a further surface for viewing.

The device allows two way communication to and from a remote location and allows for a broadcaster to send advertising material to a user but also allows the user to send data to a broadcaster/retailer or similar, thereby allowing the user to order goods from the retailer from their own home. The device can be used in conjunction with a conventional television system having means to receive data broadcast from a remote location via satellite, cable and/or terrestrial broadcast systems and which receiver also provides means to allow the sending and receiving of data via a communications link, such as by connection to a telecommunications link.

The advantage of the magnification means is that it allows material, typically advertising material to be seen by as many persons as possible, to be displayed in as large a format as possible and to make a visual impact.

In one form of the device there is provided a means for allowing the ability for a user in their premises to compile a list of data such as data relating to products for a shopping list and to later transmit the data via a communication link to a supplier or supplies of the goods represented by the data and which supplier can then subsequently supply the goods. Thus, there is no need for the user to actually attend the retailers premises. Furthermore, the retailer can download data to the device to allow the production of adverts, or other information to the user via the device. It is also envisaged that in one embodiment the device is compatible with and used in conjunction with a broadcast data receiver of the type provided with a means to receive data broadcast from a remote location via satellite, cable and/or terrestrial broadcast systems and which receiver is also provided with means to allow the sending and receiving of data via a communications link such as by connection to a telecommunications network.

It is envisaged that this form of device will be used extensively by users due to the time savings, convenience and other benefits but, inevitably there will be periods of time during which the device will not be in direct use for the intended purpose by the user. In these periods of time it is envisaged that the device will be retained in a holder or cradle and, during said time a power source such as a battery, or batteries, in the same can be charged via charging means in the cradle.

In a further aspect of the invention there is provided a device which allows for the input of data, the processing of data, storage of same in the device and selected communication of said data to a remote location either directly via a communications link or via a broadcast data receiver and then via a communications link, said device provided for location in a holder and characterised in that the said device includes therein processing means to allow audio data received from a remote location to be decoded and an audio service provided.

In one embodiment, when the device is provided in engagement with the holder, in addition to connection between a power cell in the device and power charger, there is provided a connection between audio reproduction means in the device and at least one speaker provided in the holder. This therefore means that the audio data which is decoded in the device, can be provided to allow the generation of audio via the at least one speaker in the holder so as to be heard by persons in the vicinity of the device without the need for headphones or other apparatus to be physically connected to the holder and/or device.

Typically the holder will also include an amplifier to allow the audio to be amplified sufficiently for generation via the speaker.

Typically, a power supply to the holder to allow the recharging of a power cell of the device will also be used to power the speaker and amplifier.

The audio data which is decoded and generated may, for example, be a radio station channel or a selected one of a number of radio station channels which are received via receiving means provided in the device; may be, or may include, advertising material which has previously been received by the device via a broadcast data receiver, stored and then subsequently can be replayed from the device when the device is mounted in the holder.

Specific embodiments of the invention are now described with reference to the accompanying figures, wherein.

DETAILED DESCRIPTION OF THE PREFERRED EMBODIMENTS

Figure 1:
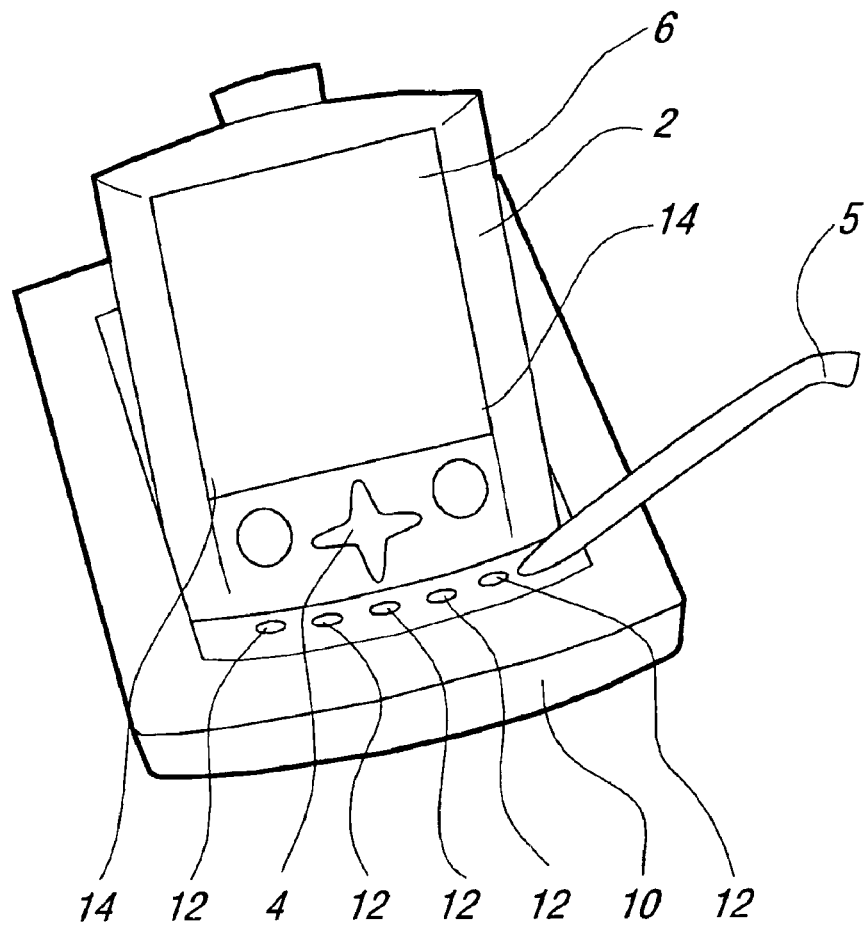
FIG. 1 illustrates the device of FIG. 1 in position on a holder in accordance with the invention.

Referring to FIG. 1, there is illustrated a device according to the invention in one embodiment. The device 2 includes a housing which is encased a processing means which can include a memory for the storage of data which is input into the device, processing means to allow the data which is input to be stored in an appropriate manner, further processing and decoding means which allows data which is received from a remote location in an encoded format to be decoded and then processed, and a power cell which, typically, is rechargeable and which is provided to allow the device to be used independently of a holder or mains power supply. Also typically provided is a lighting means at the display screen which allows limited back lighting of the display screen 6 so as to improve the ability of the user to view the display material on the screen.

The device is provided to allow the input of data which can be in a number of forms such as, for example, the device may be provided with a barcode reader which allows the device to be placed in the vicinity of barcodes and products, and by reading the same, data relating to the product is input into the device and stored. There may be provided a keypad 4 and "pen" 5, as shown, which allows the user to input data into the device by typing in appropriate codes, words or the like and/or touching the screen with the pen to select displayed functions. The screen 6 also provides information to the user with respect to the operation of the device and other material such as advertisements and the like.

There is typically also provided at least one means of receiving data from a remote location such as, for example, an aerial which will allow, for example, radio broadcast to be received and alternatively, or in addition, the device can be provided to allow connection with a broadcast data receiver or other communication means, not shown, and in which connection can be achieved via a cable connection. If a broadcast data receiver is provided, the same is provided to allow the reception of broadcast data from a remote location and, from said data, which is typically transmitted from any of satellite, cable or terrestrial system, a range of television programmes can be made available for selection by the user. In addition, the broadcast data receiver typically includes a further communications link, typically a telecommunications link, to a remote telecommunications network and the device of the invention, in the preferred embodiment, is provided to utilise this telecommunications link to connect to and communicate with the broadcast data receiver to allow the transfer of data to the receiver, perhaps for viewing on a television screen and/or accessing other information received by the receiver.

Thus, in use, it is envisaged that the device can be held in the hand by the user and can be separated from a holder 10 for the same which can be provided to stand alone or may alternatively be provided as part of another piece of apparatus such as, for example, a broadcast data receiver. The user can then input the data which is required, such as for example, data indicating those products which they wish to purchase from a particular retail outlet, and they may do so as they move around the house with the device, while they are out of the house with the device, and so on. The device 2 can also be used when mounted on the holder 10 as shown in FIG. 1. In any case, the data which is input is stored in the device and, when needed, the device is connected to a communications link so that the data can be downloaded to a retailer or other organisation as required via the telecommunications link directly or may be linked firstly to the broadcast data receiver and, from the same transferred via the telecommunications link connected to the same.

Figure 2:
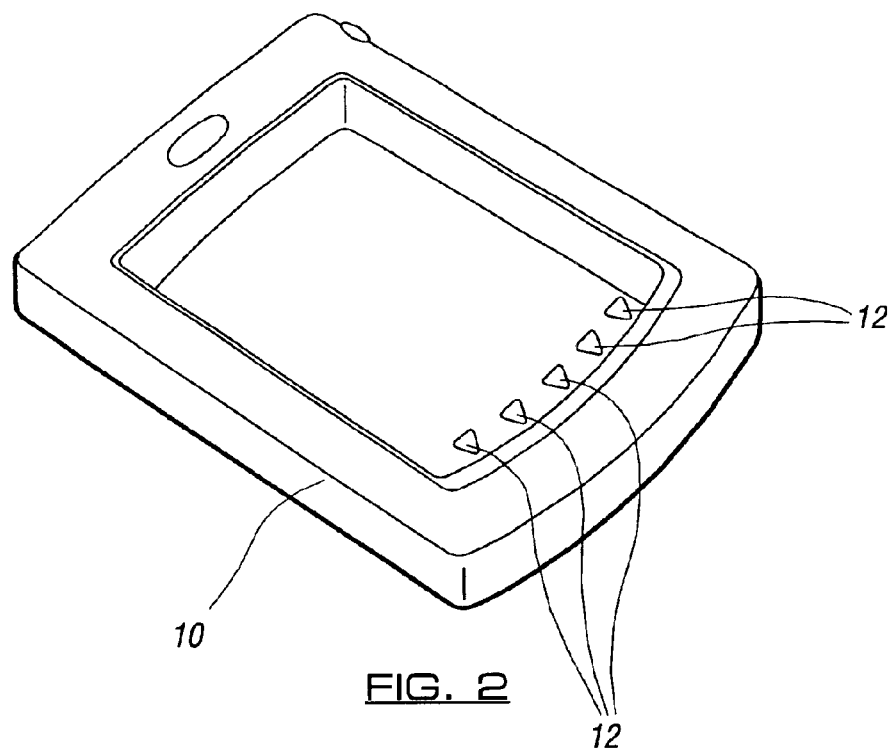
FIG. 2 illustrates the holder in accordance with one embodiment of the invention.

When not in use, the device will typically be required to be charged so that the power cell in the device is fully functional and all the features of the device can function. Typically the holder 10 is provided with means for charging the power cell when the device is placed therein, and in accordance with the invention, the holder is further provided with at least one light source 12 and control means therefor and a mains power supply as illustrated in FIG. 2.

It is envisaged that when the device is in use and not placed in the holder 10 then the light source 12 of the holder will be unlit to save the life of the light source and also save power.

Figure 3:
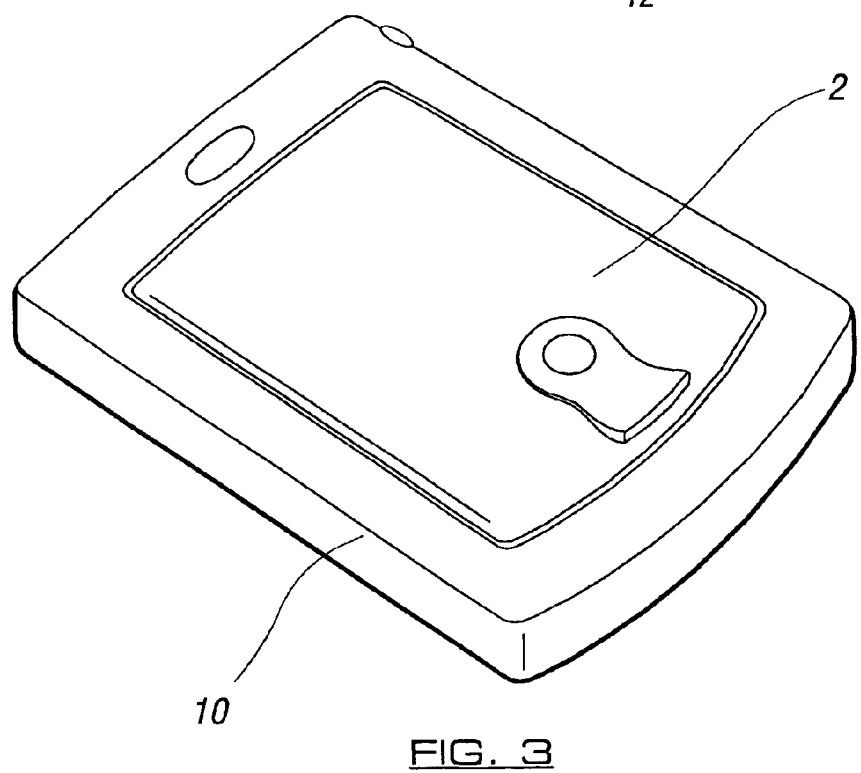
FIG. 3 illustrates the device of the invention in a holder in a stored condition.

When the device is not in use and is in the holder 10 as shown in FIG. 3 or may be in use but is placed in the holder in any case as shown in FIG. 1, the action of placing the device in position in the holder causes electrical connection between the device and the holder and, at the same time, causes the control means for the light source 12 to be enabled. In one embodiment, this enablement causes the light source to be illuminated at that time or, alternatively and preferably, the light source remains in an unlit condition and is not illuminated until data is received for display on the display screen by the device when in the holder, at which stage the light will be illuminated or the act of opening the screen from the position of FIG. 3 to the in use position of FIG. 1 causes each light source 12 to illuminate. Yet further, the light source 12 may not be illuminated until the user of the device selects the same, either by control means on the device and/or the holder.

In any case, when the light source is illuminated, light guide means 14 are provided which pass from the light source to the device and serve to guide the light which is generated from the light source to the device and onto the display screen to either illuminate the same from the front or from the rear, as appropriate for the particular form of display screen used. This light augments any back lighting provided on the device itself, or alternatively, may replace the back lighting on the device if provided, for the duration of the device being placed in the holder but, in any case, the provision of the light source in the holder enables illumination of the display screen to a significantly greater extent than is possible when the device is not in the holder.

In turn, this means that the visual impact of the material of the display screen will be enhanced to the user, which is important, firstly because the device is in a stationary position in the holder and the user may wish to view the display screen from a further distance than would be the case if they were holding the device and, secondly, it allows the display screen of the device to be used to indicate material which is received by the device at unexpected times. Thus the increased illumination or, yet further, the change in condition from unlit to lit, when the data is received, serves to attract the user's attention to the display screen to view the material and this is especially important when the material is in the form of advertisements which obviously the provider would wish the user to view.

Figure 4:
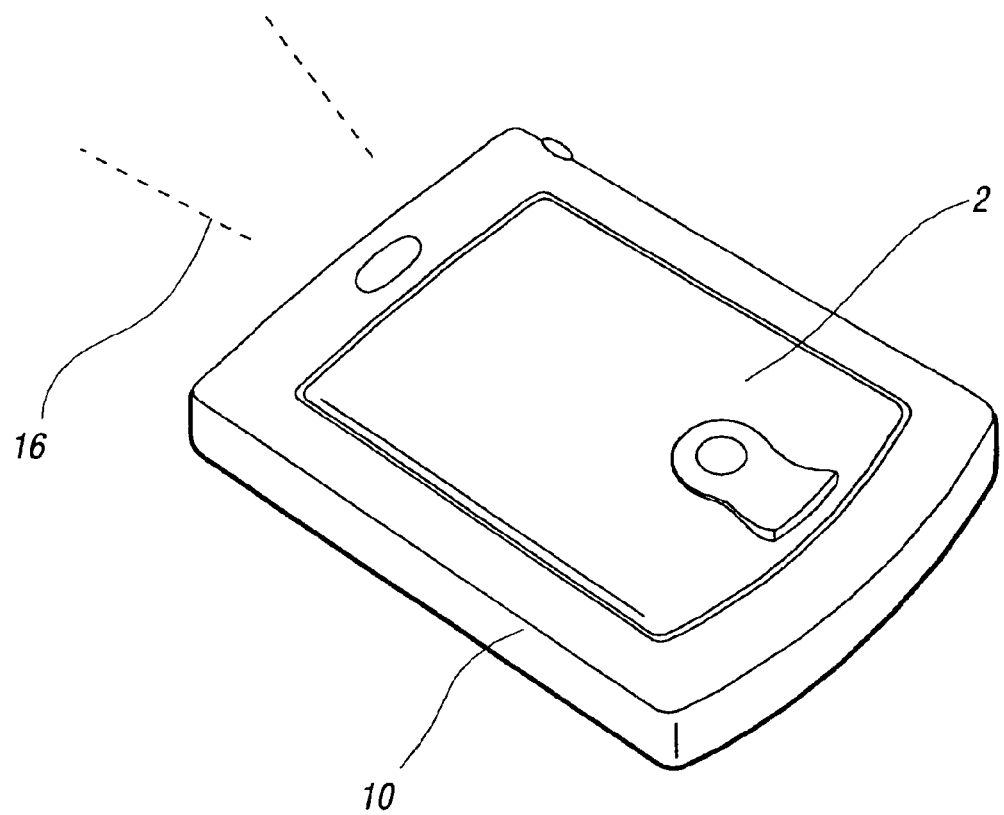
FIGS. 4 and 5 illustrate further embodiments of the present invention.
Figure 5:
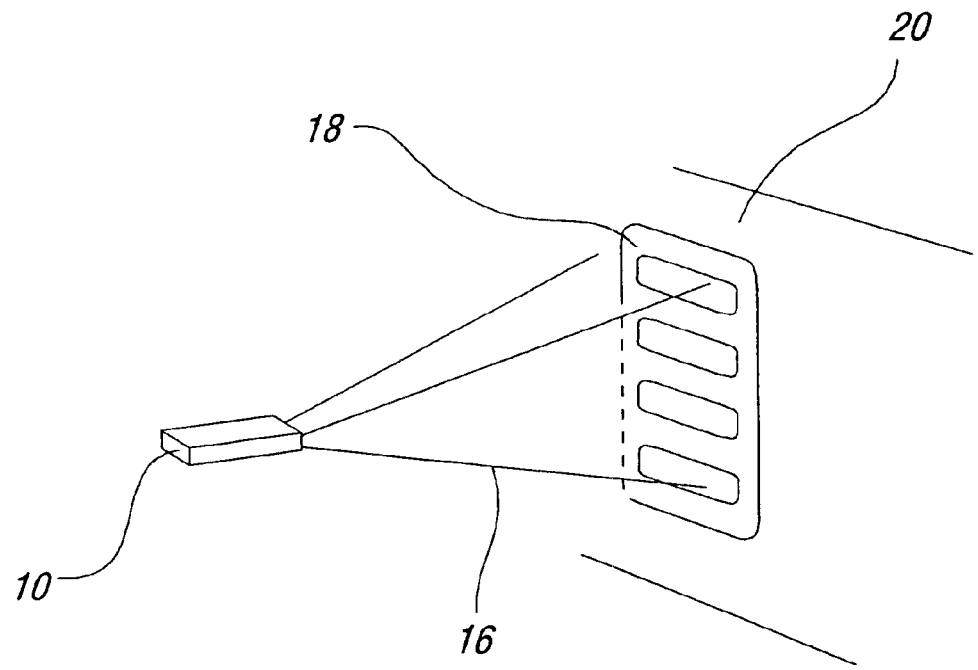

Referring to FIGS. 4 and 5, the holder is further provided with a projection and magnification means whereby data which is held in the device and which would conventionally be used to generate a display on the display screen 6 is instead, or alternatively is also, transferred via a connection between the device and the holder, to processing means provided in the holder to generate a video display 16 from the holder for projection of an image 18 onto a surface 20. The projection means typically comprise a series of lens and typically also a light source and, when operational, the projected image is emitted from the holder and can be directed onto a further surface, such as a door or wall. Material is then displayed on the door or wall in a significantly magnified form to that in which it is displayed on the display screen 6 of the device and so the user, while they may not actually be using the device while it is in the holder, can view the material which is displayed via the device and holder in the room without actually having to go to the device itself. This allows the provider of the material data, which may for example be advertisers or retail outlets, to have a better opportunity to have users view the material even when the device is not in use. It is envisaged that the projection means will be focused as with conventional projection means so as to suit particular user requirements.

In a further embodiment projection and magnification means are again provided but in this case they are provided in the device itself so that the material which is for display on the display screen 6 can also selectively be projected from the display device onto a further surface at any location rather than just at the location of the holder. Yet further, or alternatively, there may be provided a communications link between the device and the holder or the holder may be provided with means to receive data directly, which means that the holder can be used to generate the material onto a further surface without the need for the device to be provided as part of the holder.

Indeed and in yet a further aspect which is not shown, the holder itself may be provided with a display screen so as to provide a permanent base at which the material can be displayed on the holder screen and a portable device which can be carried by the user.

Figure 6:
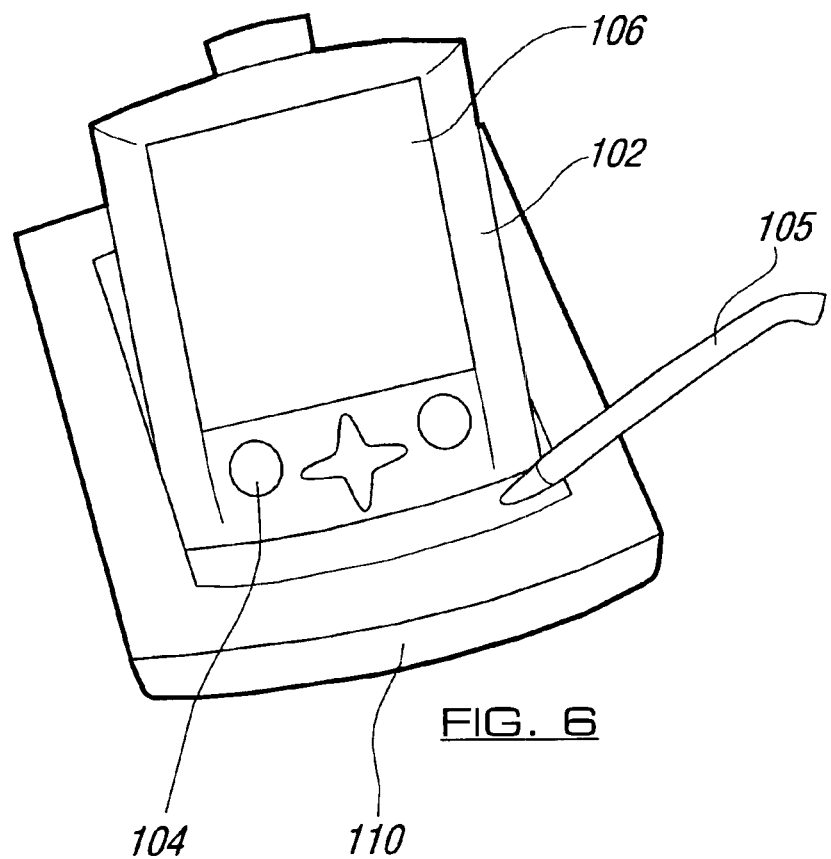
FIG. 6 illustrates one embodiment of a device as referred to in the invention in an in use position.

Referring now to FIG. 6, there is illustrated a device according to the invention in one embodiment. The device 102 includes a housing in which is encased a processing means which can include a memory for the storage of data which is input into the device, processing means to allow the data which is input to be stored in an appropriate manner, further processing and decoding means which allows data which is received from a remote location in an encoded format to be decoded and then processed, and a power cell which, typically is rechargeable and which is provided to allow the device to be used independently of a holder or mains power supply.

The device is provided to allow the input of data which can be in a number of forms such as, for example, the device may be provided with a barcode reader which allows the device to be placed in the vicinity of barcodes on products, and by reading the barcode, data relating to the product is input into the device and stored. There may be provided a keypad 104 and "pen" 105 as shown, which allows a user to input data into the device by typing in appropriate codes, words or the like and/or touching the display screen 106 with the pen to select displayed functions and typically the screen 106 provides information to the user with respect to the operation of the device.

The device also includes a means of receiving data from a remote location such as, for example, an aerial which would allow for example radio broadcasts to be received and tuning means can be provided on the device to allow the user to tune to a particular transmission frequency. Alternatively, or in addition, the device is provided to allow connection with a broadcast data receiver, not shown, and which connection can be achieved via a cable connection. The broadcast data receiver is typically provided in the premises to allow the reception of broadcast data from a remote location and, from said data, which is typically transmitted via any of satellite, cable or terrestrial systems, a range of television and radio programmes can be made available for selection by the user. In addition the broadcast data receiver typically includes a further communications link, typically a telecommunications link, to a remote telecommunications network and the device, in a preferred embodiment, is provided to utilise this telecommunications link by connecting and communicating with the broadcast data receiver.

Thus, in use, it is envisaged that in one embodiment the device 102 can be held in the hand by the user and separated from a holder for the same or a broadcast data receiver or, as shown in FIG. 6 can be used in an in use position mounted in the holder 110. The user can then input and/or access the data which they require, such as for example, data indicating those products which they wish to purchase from a particular retail outlet, and they may do so as they move around the house, while they are out of the house and so on. In any case, the data which is input is stored and, when needed to use a communications link, typically via a broadcast receiver, they can connect the device to the same and download the data which has been input to the retailer from whom they would wish the products represented by the data to be obtained and supplied. In due course, the retailer can then provide the ordered products and without the need for the user to actually visit the retail outlet if they so wish.

Figure 7:
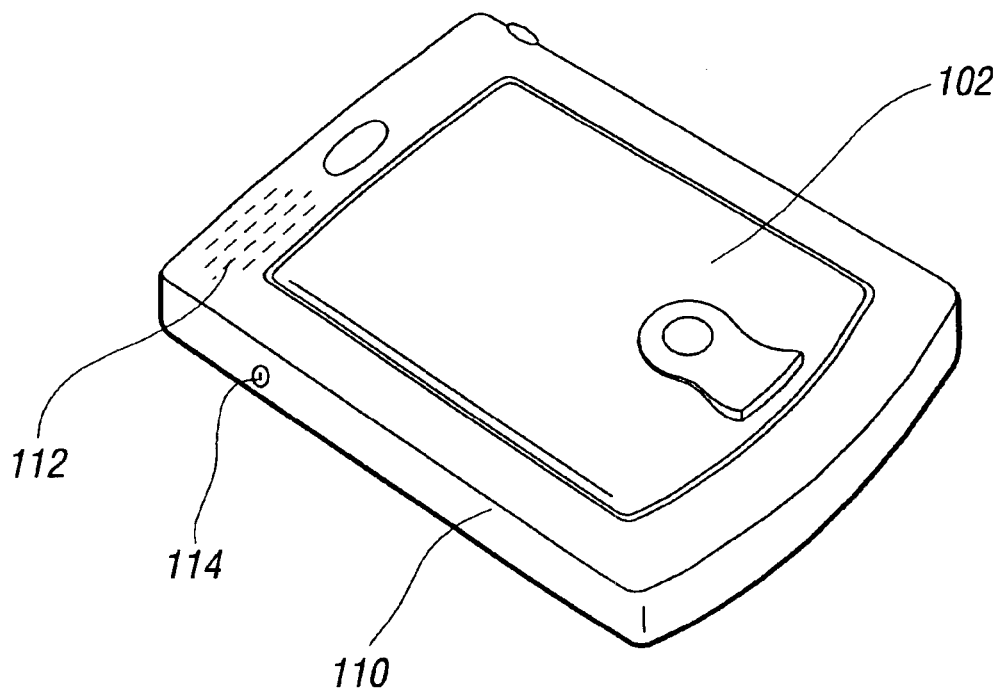
FIG. 7 illustrates the device of FIG. 6 in position in a holder in a stored condition.

When not in use, it is envisaged that the device will be held in the holder 110 as shown in FIG. 7 and, when held in the holder, the power cell of the device can be recharged via connection between a recharger provided in the holder and the device. Thus, the holder can be provided with a mains power supply to allow the recharging to take place. In accordance with the invention, the holder is further provided with at least one speaker 112 and an amplification means, not shown.

When the device is held in the holder, a data communications link is formed between the device and the holder which allows data from the device which represents an audio signal, to pass to the amplification means and hence the speaker 112. This allows the device and holder to have functionality, even when the device itself is regarded as being out of use. The device in this mode can be tuned to a particular frequency to receive a radio signal and the encoded data representing that signal can be decoded, processed and transmitted to the user via the speaker 112 in the holder 110.

Alternatively, audio data may be input to the device when the same is in use with the broadcast data receiver and the data is automatically recovered from the memory when the device is placed into the holder so that said audio data can then be generated. Yet further, when communication is made with a remote source, data, which can be both video and audio data, can be transmitted to the device and again the same can be accessed when the device is positioned in the holder, and in this embodiment it is envisaged that the display screen of the device will be used to generate the video data and the speaker in the holder is used to generate the audio data to the user, and it is envisaged that this will be of particular use for advertising material to display the same to the user via the device.

It is envisaged that the audio data decoding system will allow the device to have a wireless radio or MP3 capability and the use of the same in conjunction with the holder allows the capabilities to be fully exploited. In addition to the speaker or speakers, connection means 14 may be provided to allow headphones or other audio devices to be connected thereto Whereas, the present invention has been described in relation to the drawings attached hereto, it should be understood that other and further modifications, apart from those shown or suggested herein, may be within the spirit and scope of this invention.

What is claimed is:

1. A device which allows for the input of visual, audio and/or auxiliary data, the processing of said data and storage of said data in the device, said device comprising:

a display screen for the display of said visual data and/or speakers for sounding of said audio data wherein said device allows for the selected communication of said visual, audio and/or auxiliary data to and/or from a remote location either directly via a communications link or via a broadcast data receiver, and then via a communications link, said device being of such size so as to be hand held and portable;

a holder for storing said device when not in use and/or to allow said device to operate; and magnification means provided on said holder for magnification of material displayed on said display screen and for projection of material against a further surface for viewing.

2. A device according to claim 1 wherein the means to allow input of data into said device can be selected from the group consisting of a bar code reader, a voice synthesizer, a key pad, a mouse or a pen to touch the display screen.

3. A device according to claim 1 wherein said holder is provided with a light source which is directed, when said device is placed in said holder, to provide improved lighting of said display screen of said device.

4. A device according to claim 3 wherein said light source provided in said holder is in an off position or unlit condition until said device is placed onto said holder which acts to enable said light source.

5. A device according to claim 3 wherein light guide means are provided between said holder and said device, the light guide means serving to guide light emitted from said light source in said holder onto said display screen.

6. A device according to claim 5 wherein said light guide means are perspex or fibre optic guide means.

7. A device according to claim 3 wherein when said device is placed in said holder, said light source is not enabled until the same is switched on by the reception of said device by incoming data.

8. A device according to claim 3 wherein the display of said device is provided with bark lighting in addition to said light source of said holder.

9. A device according to claim 3 wherein said light source is permanently switched on.

10. A device according to claim 1 wherein said holder is provided with means for charging a power source of said device.

11. A device according to claim 1 wherein means are provided on said device to allow magnification of material displayed on the display screen of said device and for projecting the material against a further surface for viewing.

12. A device according to claim 1 wherein the data which is provided to generate material to be displayed on said display screen is passed to said magnified means in said holder, processed and projected onto said further surface.

13. A device according to claim 1 wherein said magnified means includes a magnifying lens in said holder.

14. A device according to claim 11 wherein the data to be displayed is processed in a magnified condition.

15. A device according to claim 1 wherein said further surface onto which the magnified data is displayed may be selected from the group consisting of a wall, door, ceiling and cupboard.

16. A device according to claim 1 wherein said device is not required to be located in said holder in order for said holder to generate the magnified material on the said further surface.

17. A device according to claim 1 wherein said holder is provided with a data link which allows said holder to receive data either directly from a remote location, or by said device and transferred by said device to said holder, whereupon said holder, when activated allows the projection and magnification of the material.

18. A device according to claim 1 wherein said device for which said holder is magnifying material in respect thereof is an electronic device having a display screen.

19. A device according to claim 1 wherein said device is a mobile phone.

20. A device according to claim 1 wherein said device is provided in engagement with said holder, in addition to connection between a power cell in said device and a power charger, there is provided a connection between audio reproduction means in said device and at least one speaker provided in connection with said holder.

21. A device according to claim 20 wherein audio data decoded via said device is generated for listening via the speaker.

22. A device according to claim 20 wherein said device or holder includes an amplifier to allow the audio to be amplified sufficiently for generation via the speaker.

* * * * *